Jan. 20, 1959

E. B. LAGUCKI 2,869,676

ELECTRO-PNEUMATIC TANK SWITCHER

Filed Jan. 7, 1957

INVENTOR:
EDWARD B. LAGUCKI
BY: J. H. McCarthy
HIS AGENT

Jan. 20, 1959  E. B. LAGUCKI  2,869,676
ELECTRO-PNEUMATIC TANK SWITCHER
Filed Jan. 7, 1957  3 Sheets-Sheet 3

INVENTOR:
EDWARD B. LAGUCKI
BY: J. H. McCarthy
HIS AGENT

United States Patent Office 2,869,676
Patented Jan. 20, 1959

2,869,676

ELECTRO-PNEUMATIC TANK SWITCHER

Edward B. Lagucki, Houston, Tex., assignor to Shell Development Company, New York, N. Y., a corporation of Delaware Application January 7, 1957, Serial No. 632,708

4 Claims. (Cl. 183—2.7)

The present invention relates to automatic control systems and pertains more particularly to an electro-pneumatic automatic control system for selectively controlling the flow of a fluid to a metering tank, an automatic custody transfer tank or to any storage tank of a multiple tank battery located in an isolated area where electric power is not available.

In some industries, such as the petroleum industry, storage facilities may comprise a battery of tanks. In order that a petroleum product or crude oil may be received continuously from its source and at the same time be measured and delivered by pipe line to other points, a tank battery is employed consisting of at least two and generally four or more large tanks all having valved inlet and outlet lines connected to common incoming and outgoing main pipe lines, respectively.

Many tank batteries are equipped with manually operated valves in the inlet and outlet lines. Thus, when oil is delivered to a tank battery a pumper or gauger manually opens the inlet valve to one tank, closes it when the tank is full or filled to the desired level and repeats this operation with every empty tank while at the same time making deliveries from the full tanks. To eliminate the manpower needed to handle deliveries to and from tank batteries, especially those tank batteries located in isolated land areas, or a considerable distance offshore, various control systems have been devised for automatically effecting and controlling said deliveries. While electrically-operated control systems have been found to be the most reliable in operation, they can only be used in areas in which electric power is provided.

It is, therefore, a primary object of this invention to provide an inexpensive automatic tank battery or an automatic custody transfer system adapted to operate in isolated land areas and at offshore well locations where electric power is not available.

A further object of this invention is to provide an electro-pneumatic tank switching control system of simple design adapted to deliver fluid automatically from a main pipe line or header to a battery of two or more storage tanks, said delivery being made only to an empty tank.

It is also an object of the present invention to provide an electro-pneumatic tank switcher that automatically by-passes any tanks in a tank battery that are either full, are being emptied, or have been taken off the line to be cleaned.

These and other objects of the present invention will become apparent from the following description taken with reference to the drawing, wherein.

Figure 1:
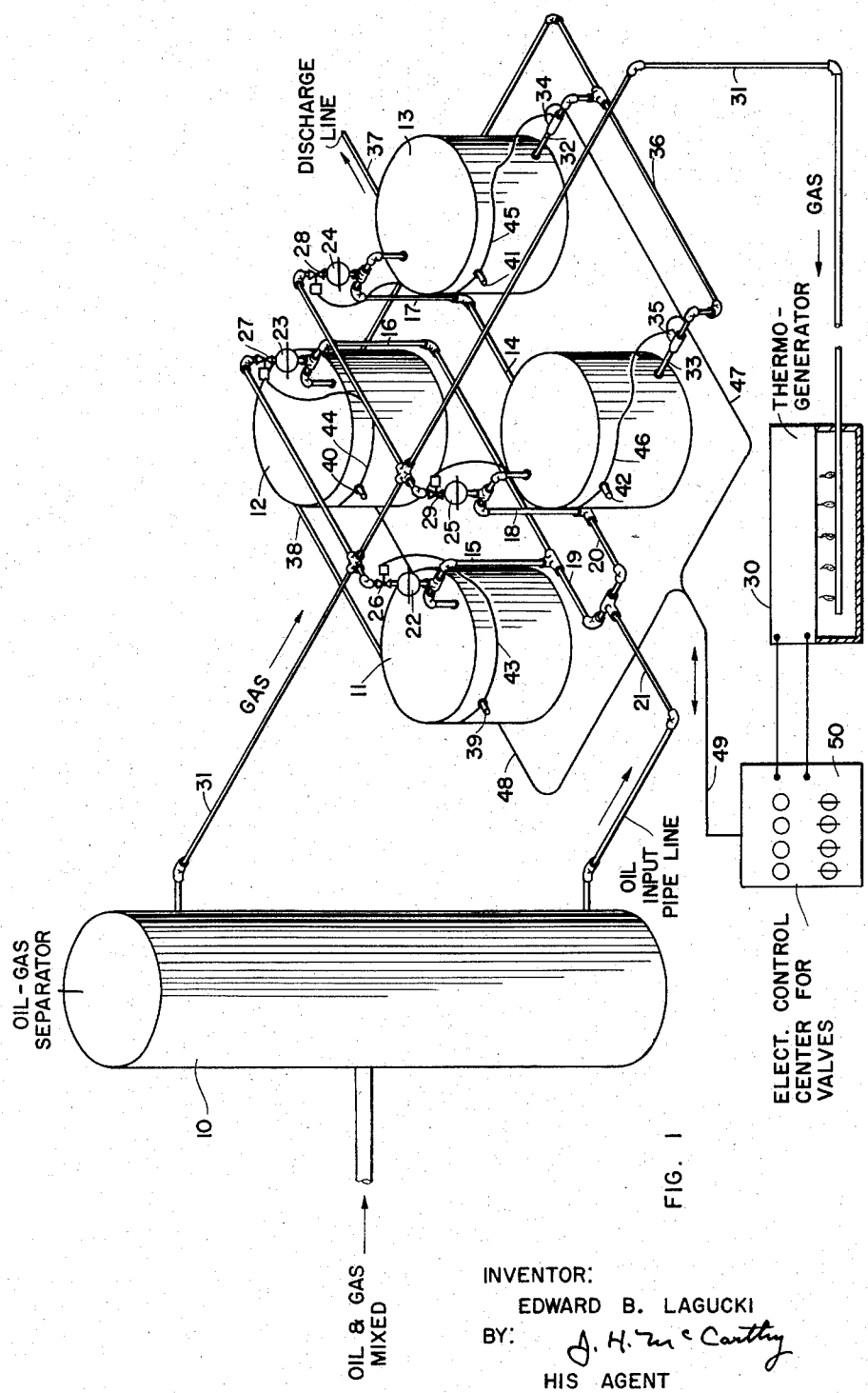
Fig. 1 is an isometric view illustrating a battery of four storage tanks connected to common delivery and discharge pipe lines.

Referring to Fig. 1 of the drawing, a battery of four storage and/or metering tanks 11, 12, 13 and 14 is illustrated as being connected through intake conduits 15, 16, 17 and 18 and headers 19 and 20 to an incoming pipe line 21, as for example, from a separator 10, a heater-treater or a dehydrator. Flow through the inlet conduits 15, 16, 17 and 18 is controlled by pressure-operated relay-actuated inlet valves 22, 23, 24 and 25 which are preferably of the diaphragm type. The inlet valves 22, 23, 24 and 25 are actuated by any suitable type of low voltage electrically-operated pilot valves 26, 27, 28 and 29 which are positioned in the gas conduit 31 leading from the top of the separator 10. The pilot valves control the flow of gas to each of the inlet valves which act as gas-operated diaphragm valves. The pilot valves are preferably of a type that remains open when energized and automatically closes in case of power failure. Since these valves do not relate to the novel part of this invention, they will not be further described herein.

Each of the tanks is also provided with a valved outlet line near or at the bottom for draining the tank. In Fig. 1, discharge lines 32 and 33 of tanks 13 and 14, having outlet valves 34 and 35 therein, are connected through header 36 to a main discharge pipe line 37. It will be appreciated that tanks 11 and 12 are also provided with similarly controlled discharge lines that are connected through header 38 with pipe line 37. The discharge valves may be manually, hydraulically or electrically operated, but will be described for simplicity as manually operated valves.

Each discharge valve, such as 34 or 35, is provided with electrical switch means, such as, for example, two single-pole, single-throw, or a double-pole, single-throw switch having one set of contacts normally open and the other set normally closed, as will be described hereinbelow with regard to Fig. 2. The two sets of contacts of the switch means may comprise elements such as micro-switches or switches of the sealed mercury type. Similar switches are also mounted on the outlet valves of tanks 11, 12 and 13. The switches may be mounted either on plug type or rising stem type discharge valves in a manner similar to that described in the U. S. Patent 2,605,780 to Nance, issued August 5, 1952.

Mounted at any desired height on the wall of each tank and near the top thereof is an electrically operated liquid-level indicator such as shown in Fig. 1 at 39, 40, 41 and 42, comprising electrical switch means adapted to be closed or open when the level of liquid within the tank rises to a predetermined height. For example, the level indicator may be of the movable-float type having a single-pole, single-throw, normally-open switch mounted on or adjacent the roof, said switch being closed by movement of the float when the rising liquid in the tank raises the float, as also described in U. S. Patent 2,605,780 to Nance.

Electrical leads to the pilot valves 26, 27, 28 and 29, the liquid level indicators 39, 40, 41 and 42 and the switches on the outlet valves such as valves 34 and 35 in Fig. 1 are shown as electrical conduits or single cables 43, 44, 45 and 46 which lead through common conduits 47, 48 and 49 to a control panel 50. Power is supplied to the control panel 50 by a thermo-generator 30 which may comprise a plurality of from 10 to 1000 or more thermocouples mounted above a heat-generating source. In this particular installation, gas from the oil-gas separator 10 is preferably led through conduit 31 to a point beneath the thermo-generator where it is burned. If desired, however, light fractions of oil obtained at the battery site may also be burned. While the thermo-generator 30 employed is not of a capacity to supply current to operate electrically-operated inlet and discharge valves of a tank battery, it can generate enough current to operate the present switching system and the electrically-actuated pilot valves.

Figure 2:
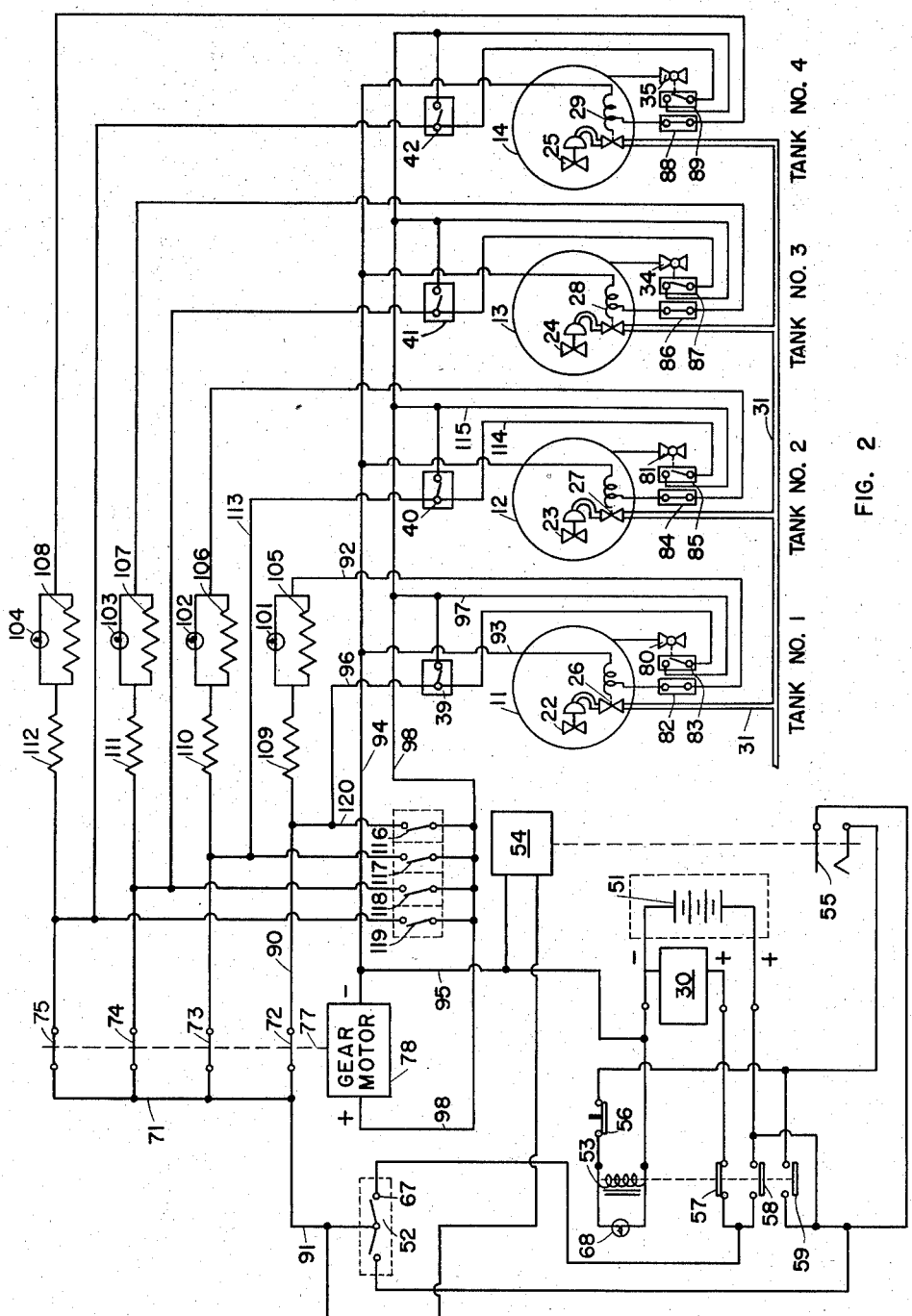
Fig. 2 is a schematic diagram of the electrical circuit of an automatic tank switcher of the present invention.
Figure 3:
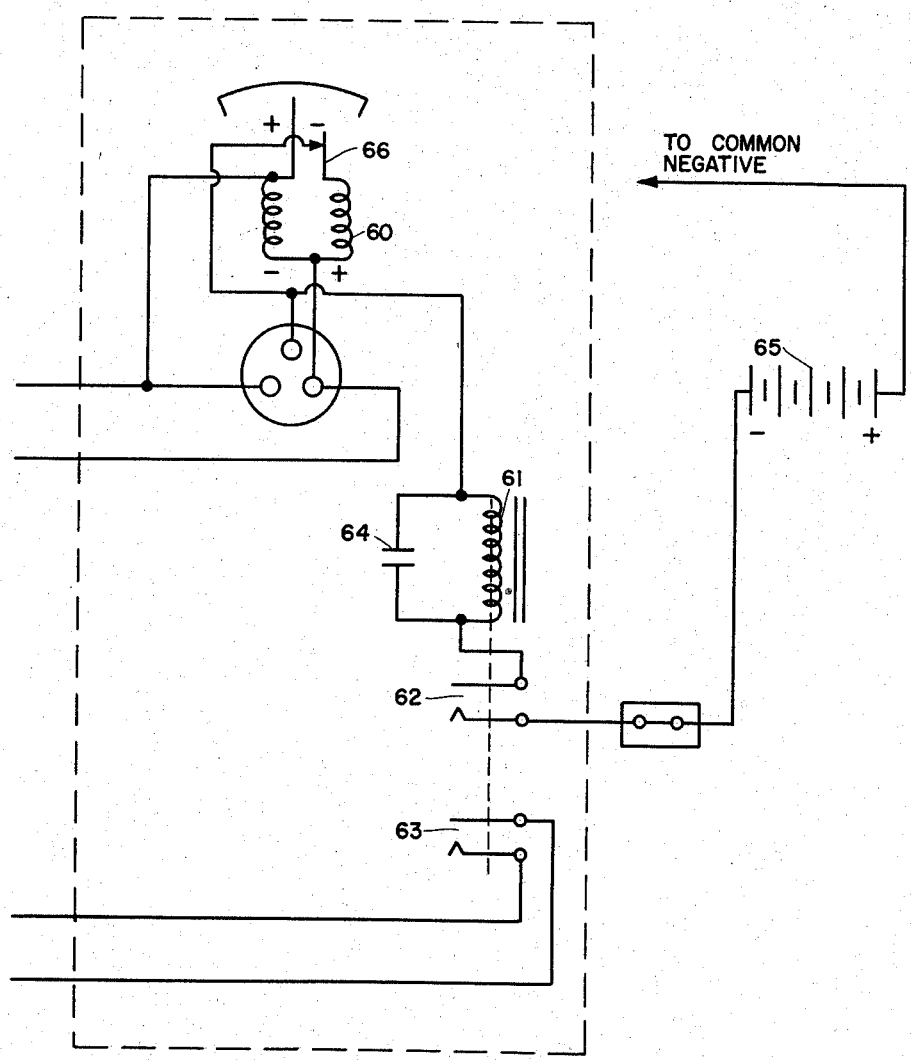
Fig. 3 is a schematic arrangement of an alternative relay system adapted to be substituted for relay 54 of Fig. 2.

Referring to Fig. 2 of the drawing, the power source for the present automatic tank battery comprises the thermopile generator 30 and an auxiliary storage battery 51 together with switching circuit means for selectively connecting one or the other to operate the tank battery system. The two power sources 30 and 51 are interconnected by circuit means including a manual power switch 52, a six volt D. C. relay 53, a low-voltage, low current relay 54 having normally-open contacts 55, and a reset button 56. The relay 53 is provided with a normally-closed contact 57, a normally-open contact 58 and a lock-in contact 59. The relay 54 may be of any desired type adapted to be actuated by a pre-set low voltage to maintain its contacts 55 open, said contacts being closed upon failure of energizing current to relay 54. Alternatively, to acquire greater sensitivity and selectivity, relay 54 may be replaced by a relay 60 (Fig. 3) electrically connected to a contact meter relay Model 261-C, manufactured by Assembly Products, Inc., Cleveland, Ohio (Bulletin G-6, September 1954). This relay 60 is electrically connected to a relay 61 having a normally-closed contact 62 and a normally-open contact 63. A capacitor, rated for example at 2000 mfd., is connected with relay 61. A storage battery 65 is required for the relay 60 because of polarity differences in the design of relay 60. The battery 65 serves to energize momentarily the electro-magnetic locking contacts of relay 60, and prevents the pointer contact 66 thereof from hunting. The battery 65 may be eliminated by employing a Model 261-C contact meter relay 60 having isolated coils, or coils with reversed polarity.

To illustrate the operation of the switching circuit of power sources 30 and 51, it will be assumed that the manual power switch 52 is closed to the generator contact 67. Power from the thermo-pile 30 is conducted through normally-closed contacts 57 to the main selector switch 71 of the present invention. Relay 53 is not energized while relay 54 is energized to hold contacts 55 open. When there is a failure of power from thermo-pile 30, relay 54 is de-energized to close normally-open contacts 55 thereby energizing relay 53 which closes its contacts 58 and 59 transferring power input to the selector switch 71 from the thermo-pile 30 to the auxiliary storage battery 51. A power failure light 68 and the relay coil of relay 53 received their power from the storage battery 51. To change the power switching circuit back to thermo-pile operation, reset button 56 is depressed and released thereby de-energizing relay 53 and reclosing its contacts 57.

In the event that relay 61, capacitor 64 and contact meter relay 66 (Fig. 3) were substituted for the relay 54 of Fig. 2, both of the relays 61 and 66 would not be energized when the thermo-pile 30 was connected to the selector switch 71. When the thermo-pile power fails, the indicator pointer of the meter relay 60 falls to close a contact 66 in meter 60 which momentarily energizes relay 61 to close the normally-open contacts 63 thereby energizing relay 53 so that power input is transferred from the thermo-pile 30 to the battery 51. The capacitor 64, arranged in parallel with the relay 61, serves as a time-delay circuit maintaining the contacts of relay 61 closed even though the energizing voltage is removed during the time the meter pointer moves from full voltage to zero voltage and back to full voltage. The switcher circuit and the stand-by storage battery 51 are provided to protect the automatic tank battery in the case of a failure of gas supply to the thermo-pile generator 31, or in the event of the fire therein being blown out. It is to be realized that the present automatic tank battery together with the oil-gas separator operates satisfactorily when the only source of power for the battery is the thermo-generator 30.

The electrical circuit of the present tank switcher system is schematically shown in Fig. 2 as comprising a plurality of tank circuits connected to a common power source, either a thermo-pile or a battery through a selector switch having a movable element adapted to close successively a plurality of contacts or switches. The actuation of one switch or a contact after another is substantially instantaneous with one set of said contacts being closed at all times. The selector switch may be provided with from 2 to 16 or more contacts or microswitches depending on the number of storage tanks in the battery being used. The selector switch 71 illustrated in Fig. 2 is a series 5800 repeat cycle timer manufactured by Haydon Manufacturing Co., Inc., Torrington, Connecticut (Catalog No. 323, January 1953). The selector switch 71 is provided with four cam-operated microswitches 72, 73, 74 and 75 which are fixedly connected to a shaft 77 (diagrammatically represented by a broken line) driven by an electrical gear motor 78 or a motor whose speed has been reduced by a suitable gear train. For example, a gear motor having an output shaft speed of about 2 R. P. M. may be used.

In the following description and in the appended claims, the electrical circuit interconnecting the inlet valve, float switch and outlet valve switches on each tank with the motor driven selector switch and the power source will be spoken of as a tank circuit. It is to be noted that the outlet valve 80 (Fig. 2) is provided with a switch having two sets of contacts or two switches 82 and 83. The other valves 81, 34 and 35 of tanks 12, 13 and 14 also have similar pairs of switches 84 and 85, 86 and 87, and 88 and 89, respectively. Switches 82, 84, 86 and 88 are normally closed, and switches 83, 85 and 87 and 89 are normally open.

For simplification in describing the parallel branch circuits of the present tank battery system, they are herein traced from the main power switch 52. One branch circuit of the tank circuit to tank 11 comprises lead 91, selector switch contact 72, leads 90 and 92, normally-closed switch 82, electrically-actuated pilot valve 26 and leads 93, 94 and 95, all of said elements being arranged in series. This circuit may be known as the "inlet valve" branch circuit. The other, or "motor" branch circuit comprises lead 91, selector switch 72, leads 90 and 96, float switch 39, switch 83 of outlet valve 80, and leads 97 and 98 to gear motor 78, which is connected through lead 95 to the power source 30 or 51 and thence to main switch 52.

The individual tank circuits of the system may be provided with indicator lights 101, 102, 103 and 104 arranged in parallel with resistors 105, 106, 107 and 108, said lights and resistors being preferably arranged in series with resistors 109, 110, 111 and 112, which are voltage dropping resistors in the respective lines. The combination of an indicator light 101 and a resistor 105 is employed to take care of bulb failures, in the event of which the system would continue to function without indication. Each of the indicator lights is connected in series with its associated pilot valve and indicates whether the valve is actuated and is operating properly.

To illustrate the operation of the present system, assume that contact 72 of the selector switch 71 is closed, since one of the contacts of said switch is closed at all times. With contact 67 of the main power switch 52 also closed, D. C. power is transmitted from the thermo-generator 30 through relay 57, closed contact 67, closed contact 72 of selector switch 71, resistor 109, indicator light 101, lead 92 through normally-closed switch 82 on the outlet valve of tank 11 to the electrically-operated pilot valve 26, energizing and opening valve 26 in the gas line 31 to allow the supply gas pressure to open the gas-operated diaphragm valve 22. With the inlet valve 22 of tank 11 open, the tank begins to fill and the valve 22 remains open until the tank is substantially filled with liquid.

When the liquid level rises to the float switch or liquid level indicator in the tank 11, switch 39 is closed whereby current passes through lead 96, closed float switch 39, and leads 97 and 98 to energize gear motor 78 which rotates to open contact 72 and to close contact 73 simultaneously. In the event that tank 12 is empty, the closing of contact 73 of the selector switch 71 directs current through the tank circuit of tank 12 to energize its pilot valve 27 and open its inlet valve 23 so that it is filled in a manner similar to that described for tank 11. Normally the coil of the pilot valve 27 would be energized, but in the event that the tank 12 was being emptied, the outlet valve 81 would be open whereupon normally-open contacts 85 would be closed and normally-closed contacts 84 would be open. Thus, the current by-passes the control winding or relay of the inlet valve 27, flowing from selector switch 71 through leads 113 and 114, closed switch 85 and leads 115 and 98, thus closing the motor branch circuit of tank 12 whereby the motor 78 remains energized and the rotating shaft 77 of selector switch 71 continues to rotate opening contact 73 and closing contacts 74.

Preferably, the circuits of tanks 11, 12, 13 and 14 are provided with by-pass switches 116, 117, 118 and 119, respectively. These switches are used to eliminate one or more tanks from the switching sequence in the event that an empty tank is to be cleaned or repaired, or for other similar reasons. Thus, assuming that tank 11 was being cleaned and its by-pass switch 116 had been closed, after the previous tank had been filled in the above described manner and the shaft 77 of the selector switch 71 had rotated to close contact 72, the current would pass through lead 120, closed switch 116 and lead 98 to the motor 78. The motor circuit of tank 11 is thus closed and the motor 78 remains energized so as to rotate the shaft 77 of selector switch 71 to open contact 72 and close contact 73.

From the above description, it is seen that the present tank selector or switcher system skips a tank in the battery that is full, being emptied, or taken out of service for repair or cleaning. The motor driven rotary selector switch continues to rotate until an empty tank is found having its outlet valve closed so that the contacts 82, 84, 86 or 88 are closed, whereby the inlet valve or pilot valve branch circuit of the empty tank is closed, thus energizing and opening an electrically-operated pilot valve 26, 27, 28 or 29.

The incorporation in the motor branch circuit of the switches on the outlet valve of each tank is for the purpose of preventing fluid from being run inadvertently into a tank from which fluid is being discharged into the outlet pipe line 36 or 38 (Fig. 1).

Instead of employing an oil and gas separator 10 as shown in Fig. 1, it is realized that in oil fields where the production fluid consists of oil, gas and water, an oil, gas and water separator of any suitable type well known to oil field practice may be employed with the water being extracted and discarded prior to flowing or pumping the oil to any of the various tanks in the tank battery while at least a portion of the gas of the separator is employed to operate the gas-actuated valves of the system and to furnish a supply of fuel by the thermo-generator.

While the above description has been directed to tank batteries having two or more tanks, the present invention can also be utilized in automatic custody transfer systems having one or more tanks that are alternately filled and emptied to meter the oil prior to its delivery to a common pipe line. A single tank system would operate in a manner similar to a multiple tank battery with the selector switch 71 closing to energize the system causing the tank inlet valve to open and subsequently close in the above-described manner when the rising fluid in the tank actuated the liquid level indicating means. The discharge valve on the single tank system may be opened and closed manually or automatically as with the above-described multiple tank system, automatic actuation of the valve being either controlled by the selector switch 71, the liquid level indicating means or a timing element.

I claim as my invention:

1. An automatic system for separating an oil field production fluid comprising oil and gas into its individual components and selectively controlling the flow of oil into a multiple tank battery while utilizing at least a portion of the gas as a source of power for said system, said system comprising separator means for separating oil and gas from a well production fluid, at least two storage tanks, oil discharge means from said separator in communication with an intake line to each of said tanks, pressure-operated inlet valve means in each of said intake lines, a gas supply line in communication between said separator means and each of said pressure-operated inlet valve means, electrically-actuated pilot valve means in said gas supply line adjacent each of said pressure-operated inlet valve means, circuit means including selector switch means for successively energizing each of said pilot valve means, a power source comprising a thermo-generator for supplying electric power to said circuit means, gas-burning means positioned adjacent said thermo-power generator for heating said generator, and conduit means in communication between said separator and said gas burning means for supplying gas thereto.

2. An automatic system for separating an oil field production fluid comprising oil and gas into its individual components and selectively controlling the flow of oil into a multiple tank battery while utilizing at least a portion of the gas as a source of power for said system, said system comprising separator means for separating oil and gas from a well production fluid, at least two storage tanks, oil discharge means from said separator in communication with an intake line to each of said tanks, pressure-operated inlet valve means in each of said intake lines, a gas supply line in communication between said separator means and each of said pressure-operated inlet valve means, electrically-actuated pilot valve means in said gas supply line adjacent each of said pressure-operated inlet valve means, circuit means including selector switch means for successively energizing each of said pilot valve means when said storage tanks are empty, a power source comprising a thermo-generator for supplying electric power to said circuit means, gas burning means positioned adjacent said thermo-power generator for heating said generator, conduit means in communication between said separator and said gas burning means for supplying gas thereto, an auxiliary power source comprising a battery and switching circuit means for connecting said battery into said automatic system upon failure of the thermo-generator to produce sufficient power.

3. The automatic system of claim 2 wherein each of said tanks is provided with liquid-level indicating means mounted on said tanks, said indicating means being equipped with electrical switch means, valve outlet means equipped with first and second electrical switch means, and prime mover means for actuating said selector switch means, said prime mover means being electrically connected to each of said level indicator switch means, to one of said switch means on each of said tank outlet valve means and to said selector switch means, said pilot valve means, said switch means on said level indicator means and said other outlet valve switch means of each of said tanks being connected parallel through said selector switch to the power source.

4. An automatic system for separating an oil field production fluid comprising oil and gas into its individual components and metering at least the flow of oil into a tank battery while utilizing at least a portion of the gas as a source of power for said system, said system comprising separator means for separating oil and gas from a well production fluid, at least one metering storage tank, oil discharge means from said separator in communication with an intake line to said tank, pressure-operated inlet valve means in said intake line, a gas supply line in communication between said separator means and said pressure-operated inlet valve means, electrically-actuated pilot valve means in said gas supply line adjacent said pressure-operated inlet valve means, circuit means including switch means for energizing said pilot valve means, a power source comprising a thermo-generator for supplying electric power to said circuit means, gas burning means positioned adjacent said thermo-power generator for heating said generator, and conduit means in communication between said separator and said gas burning means for supplying gas thereto.

References Cited in the file of this patent

UNITED STATES PATENTS

| | | |
|---|---|---|
| 1,118,269 | Creveling | Nov. 24, 1914 |
| 1,286,429 | Shindel | Dec. 3, 1918 |
| 2,605,780 | Nance | Aug. 5, 1952 |
| 2,698,055 | Williams | Dec. 28, 1954 |
| 2,779,348 | Robertson | Jan. 29, 1957 |

FOREIGN PATENTS

| | | |
|---|---|---|
| 827,186 | Germany | Jan. 7, 1952 |